July 1, 1958  J. M. WATT  2,841,630
BATTERY AND METHOD OF FABRICATING
Filed May 18, 1954  3 Sheets-Sheet 1

INVENTOR
JACK MORGAN WATT
BY Lynn H. Latta
ATTORNEY

July 1, 1958 J. M. WATT 2,841,630
BATTERY AND METHOD OF FABRICATING
Filed May 18, 1954 3 Sheets-Sheet 2
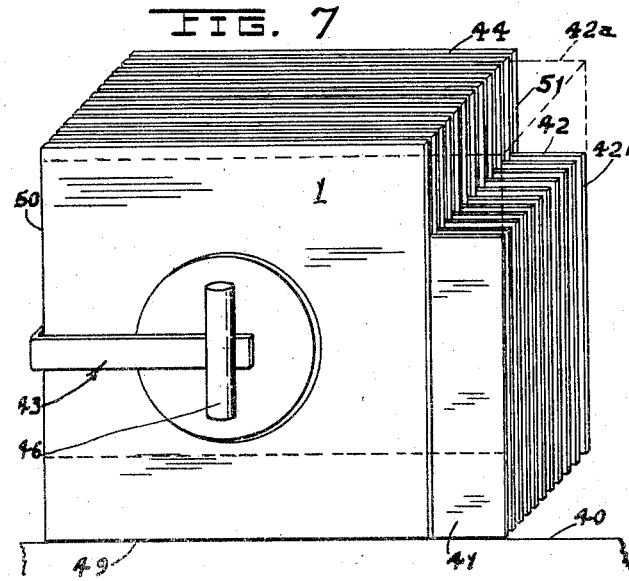
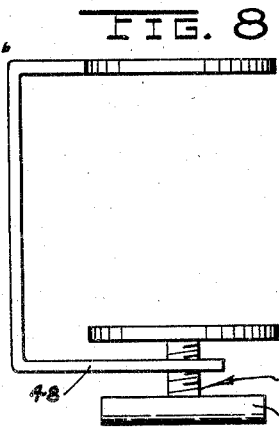
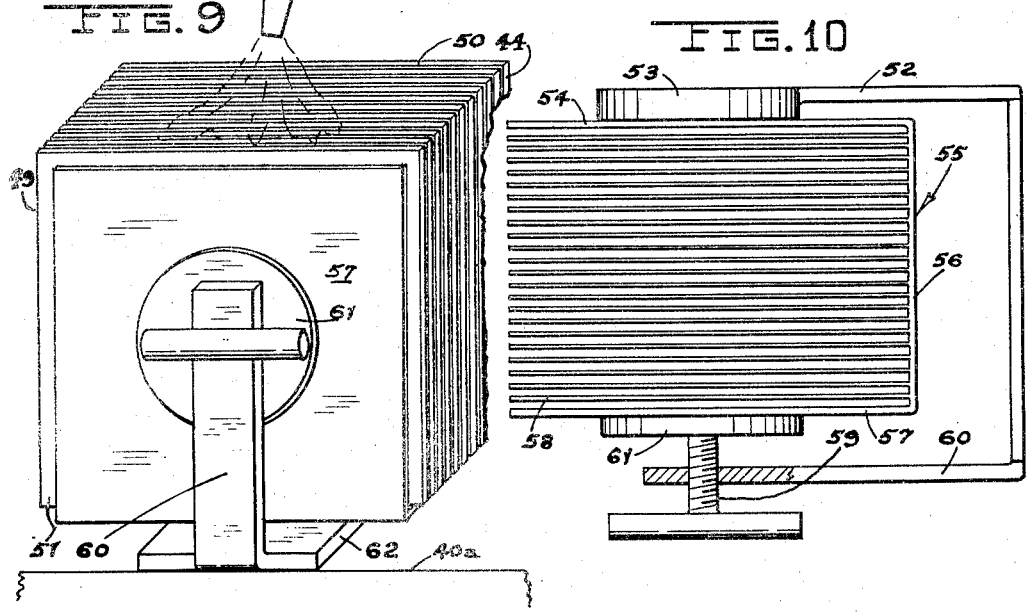
INVENTOR.
JACK MORGAN WATT
BY
*Lynn H. Latta*
ATTORNEY July 1, 1958 J. M. WATT 2,841,630
BATTERY AND METHOD OF FABRICATING
Filed May 18, 1954 3 Sheets-Sheet 3
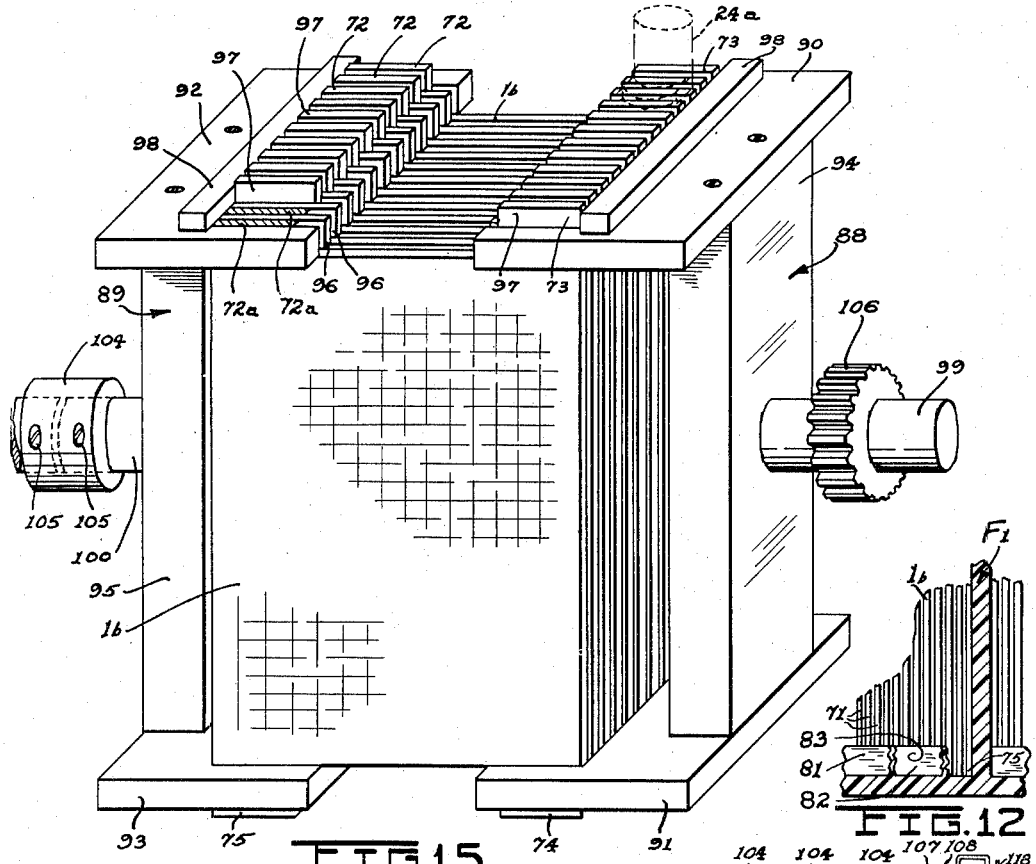
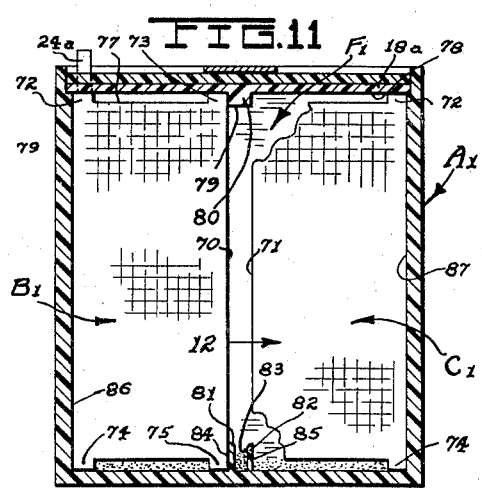
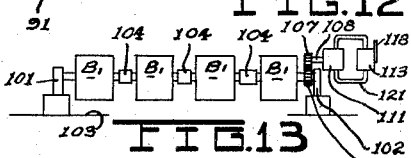
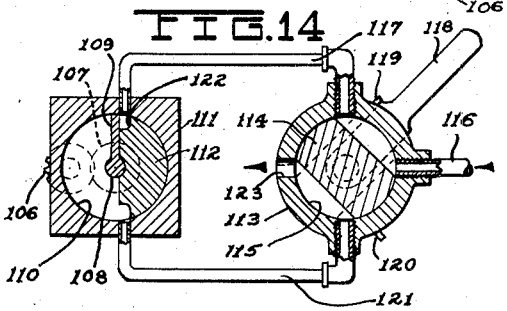
INVENTOR
JACK MORGAN WATT
BY Lynn A. Latta
ATTORNEY United States Patent Office 2,841,630
Patented July 1, 1958

2,841,630

BATTERY AND METHOD OF FABRICATING

Jack Morgan Watt, Los Angeles, Calif.

Application May 18, 1954, Serial No. 430,490

2 Claims. (Cl. 136—15)

The invention relates to electric storage batteries and has particular reference to the construction and method of fabricating of the individual cells of the battery and the cell arrangement within the battery casing. The invention also has reference to the construction of the battery cover and battery cap arrangement.

In a conventional storage battery for automotive use wherein three cells are employed, each cell is made up of a series of electrodes in plate form, said electrodes being referred to in the trade as "plates" and being arranged in laminated fashion within the cell container, each successive plate being separated from the adjacent plate by means of a separator which is in plate form and which functions to insulate the succeeding plates from each other. Each alternate electrode is a positive electrode and a negative electrode is mounted between each of the positive electrodes.

Each plate usually consists of a grid which forms the framework of the plate, the grid being made separately from material such as a lead and antimony alloy to give it strength and rigidity. The grid is in mesh form wherein a series of parallel, vertical and horizontal bars intersect and are integrally united with each other, the bars being circumscribed by a rigid rim portion. The areas defined by the intersecting bars are filled with an active material which may be a mixture containing a lead compound, such material being applied to the grid while in a soft and pliable state. A process may be employed to harden such active material, and then the material may be electro-chemically treated in order to convert the lead compound into a power producing active material.

One object of the invention is to provide a cell for a battery in which the positive electrodes are arranged in laminated fashion in one end of the cell and the negative electrodes are similarly arranged in laminated fashion in the opposite end of the cell, the two groups of electrodes being separated by a single insulator plate.

Another object of the invention is to provide a cell for a battery in which the positive electrodes are arranged in laminated fashion in one end of the cell and the negative electrodes are similarly arranged in laminated fashion in the opposite end of the cell, the two groups of electrodes being separated at their upper ends by an elongated bead formed on the cell cover and at their lower ends by an elongated slotted rib on the floor of the battery casing for trapping sediment which is shed from the end edges of the electrodes.

Another object of the invention is to provide a cell construction in which the positive electrodes are arranged in one group and the negative electrodes in a separate group, said electrodes being fused about three of their margins to form a rigid unitary composite laminated electrode structure.

Another object of the invention is to provide a cell construction in which the electrodes are highly resistant to buckling, each electrode being of thin walled construction and spaced a minimum distance from each succeeding electrode.

Another object of the invention is to provide a cell construction in which the electrodes are provided with protruding ears along four margins, the ears being fused to each other to form electrodes which are interlocked throughout four margins thereof thereby providing a rigid unitary structure which is open on all four sides to permit free passage of the liquid electrolyte solution therethrough.

Another object is to provide an electrode assembly in which all of the plates are of like polarity and are in spaced parallel fashion within a C-shaped clip which circumscribes three sides of each plate and is fused to the plates, the clip being of the same material as the grids of the plates.

Another object is to provide a novel method of fabricating a fused assembly.

Another object of the invention is to provide a storage battery having a casing with a novel single piece cover and cap therefor.

Other objects and advantages of the invention will be apparent from the ensuing specification and appended drawings in which:

Fig. 7 is a perspective of one method of fabricating the electrode assembly;

Fig. 8 is a plan view of a clamp utilized in the method of Fig. 7;

Fig. 9 is a perspective view of another method of fabricating the electrode assembly;

Fig. 10 is a plan view of the clamping tool utilized in the fabrication method shown in Fig. 9;

Fig. 11 is a sectional view of a modified form of battery construction similar to Fig. 2;

Fig. 12 is a fragmentary detail sectional view taken on the line 12—12 of Fig. 11;

Fig. 13 is a schematic view of apparatus employed in fabricating one form of cell;

Fig. 14 is a schematic sectional view of the apparatus of Fig. 13; and

Fig. 15 is a perspective view of one of the cells being fabricated in Fig. 13.

Figure 3:
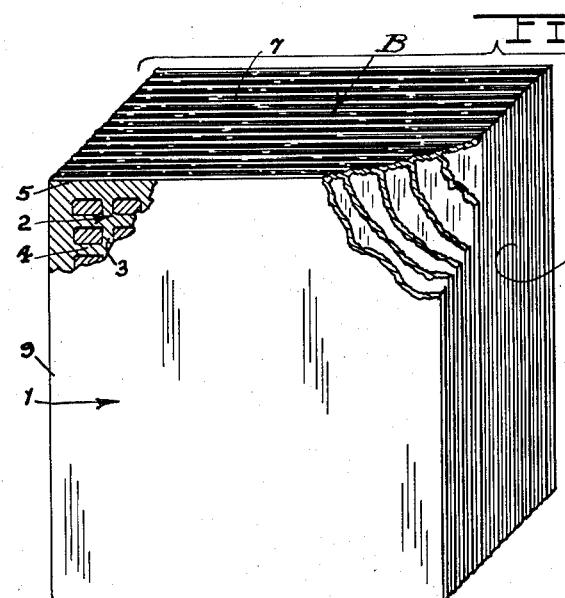
Fig. 3 is an exploded fragmentary view, partly in section, of the components of one cell.

In general, the battery includes a receptacle or casing A with a pair of transverse internal partition walls E and F dividing the casing into three separate compartments which function as the cell containers. Each cell is made up of separate electrode assemblies B and C separated from each other by means of a single insulator plate D. Referring to Fig. 3, each of the electrode assemblies is made up of a series of plates of like polarity and generally referred to by the numeral 1, which plates are arranged so that each plate lies in a plane which is substantially parallel to the plane of each succeeding plate and each plate is spaced from each succeeding plate with a minimum amount of clearance spacing. I have found that in a storage battery of the size which is commonly used for passenger automobiles, I am able to arrange a large number of separate plates within each electrode assembly, said plates having a wall thickness in the neighborhood of .098 inches and each plate being spaced from each successive plate approximately 1/32 of an inch.

Each separate plate may be constructed of a grid or framework 2 which is generally in mesh form, being made up of a series of intersecting vertical and horizontal bars 3 and 4 with a rim portion 5 circumscribing the entire periphery of the framework. This grid or framework may, if desired be made from an alloy material including lead and antimony to give it strength and rigidity as well as power producing characteristics. The areas defined between the intersecting bars may be filled with an active material such as a mixture containing a lead compound, the material being applied to the grid while in a soft and pliable state and then hardened by an electro-chemical treatment or some similar treatment in order to convert the lead compound into a power producing active material.

Figure 1:
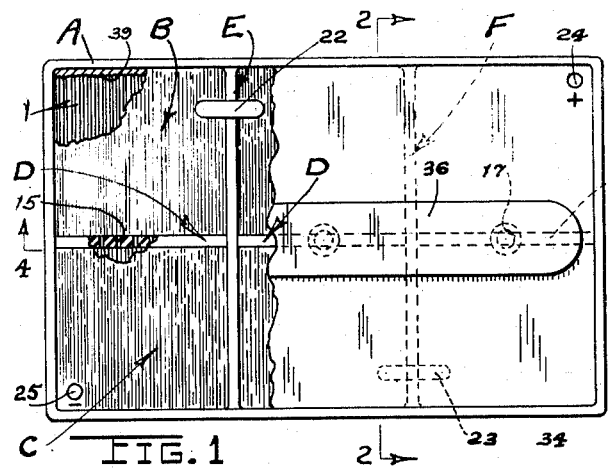
Fig. 1 is a plan view of the battery shown partly in section.
Figure 4:
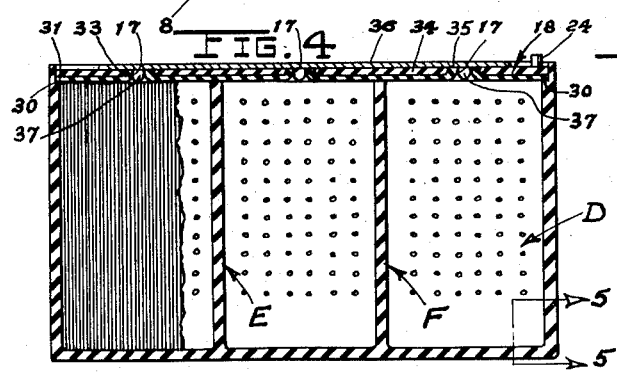
Fig. 4 is a sectional view taken on the line 4—4 of Fig. 1 but rotated 90 degrees about the major axis of the battery.

Referring to Fig. 3 the rim portions 5 of each plate are fused together in a manner to be set forth hereinafter whereby the resultant electrode assembly is fused throughout three of the four edges of each plate, in effect providing a substantially unitary upper wall 7, lower wall 8 and rear wall 9 integrally uniting the plates to each other. Thus the composite unitary structure is very rigid, permitting the thickness of the electrodes to be spaced from each other with a minimum of clearance between each successive electrode as indicated in Figs. 1 and 4. The composite structure renders the electrodes highly resistant to buckling thereby prolonging the life of each of the composite electrode assemblies and thereby prolonging the life of the entire battery.

Figure 6:
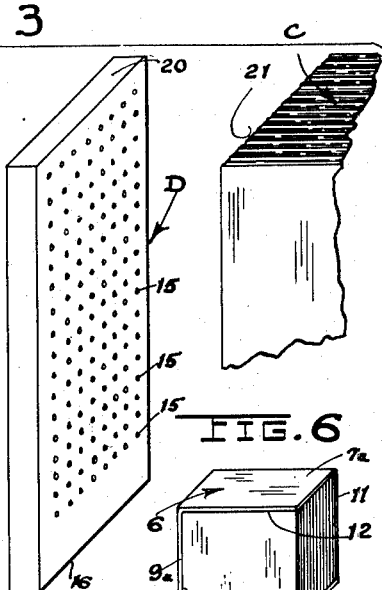
Fig. 6 is a modified form of electrode assembly.

In the modification of Fig. 6 the plates are housed within a generally C-shaped retainer clip referred to by the numeral 6, the clip comprising an upper wall 7a, a lower wall 8a and a rear wall 9a integrally interconnecting the upper and lower walls. It will be noted that the clip is open at each end and at the front. The first electrode 10 functions in the manner of the end wall at one end of the clip and the last electrode 11 functions in the manner of the end wall at the opposite end of the retainer clip. The retainer clip is preferably made of the same material as the grids of each electrode and the upper and lower longitudinal edges 12 and 13 of each electrode as well as the longitudinal rear edge 14 of each electrode is preferably fused to the inner faces of the walls 7a, 8a and 9a of the clip so that the rim portions 5a of each electrode are in effect integrally united with the walls of the clip 6.

Figure 2:
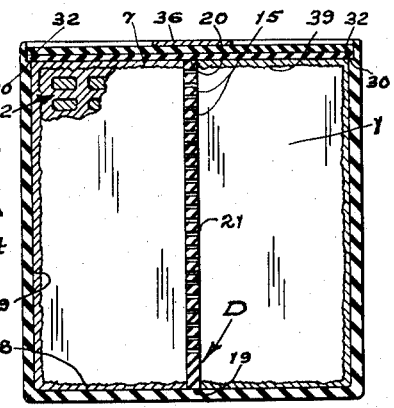
Fig. 2 is a sectional view taken through the center cell of the battery on the line 2—2 of Fig. 1 but rotated 90 degrees about the major axis of the battery.

Viewing Fig. 2 it will be noted that the full depth of the battery casing A can be utilized in that the floor portion 8 of the composite electrode assembly can rest directly on the floor of the battery casing, there being no need to provide a clearance space between the lower edges of the electrodes and the floor of the battery casing as is necessary in a conventional storage battery. The reason for this is that in a conventional storage battery wherein the cell is made up of alternate positive and negative plates, such cells are subject to becoming short-circuited when the plates have decomposed to such an extent that the decomposed material builds up on the floor of the battery casing eventually piling up sufficiently on the floor of the battery casing to reach the lower ends of the plates so as to establish electrical connection between the positive and negative plates, thereby causing short-circuiting. In the construction of my battery cell, the decomposed material can pile up to any substantial extent between the electrodes, since all of the electrodes in each electrode assembly are either positive or they are all negative and no short-circuiting can take place.

The bottom row of the perforations 15 in the insulator plate is preferably spaced to some extent from the bottom edge 16 thereof so that a considerable quantity of decomposed material can accumulate on the floor of the battery casing without being transferred by the electrolyte solution from the positive side of a cell (through the perforations 15) to the negative side or vice versa. By utilizing the full depth of the battery casing it is possible to use a larger electrode and thereby increase the power output of the battery in proportion to the size of its casing. The decomposition of an electrode is hastened due to buckling of the electrodes under use. By anchoring each of the electrodes throughout three of their four edges the tendency of the electrodes to buckle is greatly reduced, thereby forestalling the decomposition of the electrodes and consequently prolonging the life thereof.

The electrolyte which is in liquid form and which is poured into the three separate cells of the battery through the openings 17 in the one piece cover, which is generally referred to by the numeral 18, is usually a mixture of sulphuric acid and water and the electrolyte flows into the spaces between the electrodes so as to act on the opposite faces of each electrode in the production of electrical energy. Since the electrolyte must be permitted to flow freely between the electrodes of each of the electrode assemblies B and C in the cell compartment, a perforated insulator plate D is positioned between the electrode assemblies B and C so as to insulate the group of positive electrodes from the group of negative electrodes in the opposite end of the cell. The perforations in the insulator plate D permits free flowing of the electrolyte solution between the two groups of electrodes in the cell compartment. The insulator plates may be of any suitable material such as rubber or such as a ceramic material. The insulator plates could also be of any suitable material which functions as an insulator and will also permit the passage of electrolyte therethrough. Viewing Fig. 2 it can be seen that the insulator plates may, if desired, be rested directly on the floor of the battery casing at 19 and the upper ends 20 thereof may terminate adjacent the under-surface of cover 18. The open end, designated generally by the numeral 21, of each of the electrode assemblies B and C is exposed toward the insulator plates D as best indicated in Fig. 3.

Referring to Fig. 1 the assembled battery (which is a three cell battery) may include an arrangement of the electrode assemblies wherein the two end cell compartments may have the positive electrodes located at like ends thereof and the negative electrodes at the opposite end of said compartments. In the center cell compartment the positive and negative electrodes are reversed. The connecting straps 22 and 23 interconnect the three cells in series and to the respective positive and negative terminals 24 and 25 at diagonally opposite corners of the battery.

Figure 5:
Fig. 5 is a fragmentary sectional detail view of a modified form which would be taken on line 5—5 of Fig. 4.

In the modified form of the invention as shown in Fig. 5 the floor of the battery casing may have integral ribs 26 extending transversely of the three cell compartments along the center line of the battery casing and the insulator plates may have their lower margins nested within the grooves 29 formed in the upper face of each rib. The battery plates, however, may be permitted to rest directly on the floor of the battery casing so as to utilize the full depth thereof. The battery casing may be reduced in wall thickness about its entire perimeter at the upper end thereof to provide the longitudinal shoulders 30 which preferably extend along all four sides of the battery casing to provide a shelf on which the single piece cover 18 may be supported by having its end margins 31 and its side margins 32 overhanging the shoulders 30 and resting thereon. The cover may have the upwardly projecting bosses 33 with the openings 17 therein through which the electrolyte is poured into the cell compartments. After the cover 18 is inserted in position on the shoulders 30 so as to close off the upper end of the battery casing, then the sealing material 34 is poured while in a molten state on top of the cover so as to make the battery casing liquid tight at its otherwise upper open end. The sealing material 34 may be terminated at the upper level 35 of the bosses 33 and a single integral one piece battery cap 36 may be utilized to close off the openings 17. The under surface of the battery cap 36 preferably fits flush against the outer end 35 of the bosses and flush with the upper level of the sealing material 34. The battery cap 36 may have lug members 37 which project into the openings 17 to removably anchor the battery cap 36 relative to the cover of the battery casing.

In the process of fabricating the type of electrode assembly as shown in Figs. 1, 2, 3, and 4, I have shown in Figs. 7 and 8 one method of fabrication wherein the plates 1, all of which are of like polarity, are arranged on a working surface such as a table 40 with a series of spacer plates 41, of predetermined thickness, interposed between successive electrode plates, thereby maintaining the electrode plates in the proper predetermined parallel manner of spacing from each other. The spacer plates 41 are considerably narrower in width than the electrode plates so that the upper portions of the electrode plates project beyond the upper edges 42 of the spacer plates. The spacer plates are then moved up to the position indicated in dotted lines and designated by the numeral 42a with their upper edges 42 slightly below the level of the upper edges 44 of the electrode plates. Then a clamping device such as the C-clamp 43 is utilized to hold the assemblage of the loose plates in the properly assembled manner preparatory to fusing the upper edges 44 of the electrode plates by means of a suitable heating apparatus (such as a "burning" torch 45 as shown in Fig. 9). The entire surface area of all of the electrode plates at their upper edges 44 are preferably fused together to form a generally integral mass, the depth of the fusion (as indicated by numeral 39 in Figs. 1 and 2) of said plates being probably less than a quarter of an inch in order to maintain the clearance spaces between said plates throughout as much of their surface area as is possible. The extent of the fusion however should be such as to assure an ultimate rigid unitary composite structure.

The depth of the fusion is pre-determined by the setting of the upper edges 42 of the spacer plates a predetermined depth below the level of the upper edges 44 of the electrode plates and when the material of the rim portions 5 of the grids melts (the material being predominantly lead which has a low melting point) the molten lead runs down between the electrode plates only until it encounters the upper edges of the spacer plates. The spacer plates are of a material having a considerably higher melting point than the grids of the electrode plates and the molten lead will not adhere to the spacer plates. When the upper edges 44 of the electrode plates have been fused together, then the entire assembly of electrode plates can be turned upside down with the formerly upper edges 44 all resting on the table surface 40. Then the clamp 43 can be loosened by turning the handle 46 of the screw member, referred to generally by the numeral 47, which is threaded through the arm 48 of the clamp and the spacer plates 41 can be worked down between the electrode plates and positioned a proper distance beneath the level of the edges 49 of the electrode plates. Then the lower edges 49 of the electrode plates (which are now in the uppermost position previously occupied by edges 44) will project beyond the edges of the spacer plates 41 and the C-clamp can be tightened and the edges 49 of the electrode plates can be fused by means of the torch 45 or other heating apparatus in the same manner that the edges 44 were fused.

The spacer plates 41 after loosening screw 46 can now be retracted slightly inwardly of the edges 50 of the electrode plates, the screw 46 re-tightened, and the electrode plate assembly then turned 90 degrees on the table surface so that the rear edges 50 are in the upward position and the outer edges 42b of the spacer plates are resting on the table surface. The edges 50 of the electrode plates are now fused in the same manner as explained with reference to the edges 44 and the ultimate electrode assembly becomes a rigid unitary structure in which the open end 21 (see Fig. 3) thereof is the only end which is not fused and in which the clearance spaces between the electrode plates are in open communication with the atmosphere to permit the entrance of the electrolyte solution when the electrode assembly is installed in a battery cell compartment.

In the process of fabricating the electrode plate assembly as shown in Figs. 9 and 10, the jig as shown in Fig. 10 is utilized and need be tightened only once during the entire fusing operation. The jig includes a yoke 52 which may have an enlarged head portion 53 on one of its legs, the head portion 53 being preferably anchored to the end wall 54 of the gauge plate assembly referred to generally by the numeral 55. The end wall 54 is connected to the bottom wall 56 which in turn is connected to the opposite end wall 57. The gauge or spacer plates 58, which are of the pre-determined thickness to accurately determine the ultimate spacing between the electrode plates are preferably anchored to the bottom wall 56. The screw 59 is threaded through the leg 60 of the yoke and has the head portion 61 which engages the end wall 57. The jig can be placed on a table surface 48 with the base portion 62 of the yoke resting thereon. The gauge plates 58 will be projecting in an upwardly direction and the electrode plates 1 are inserted between the successive gauge plates as shown in Fig. 9 until all of the electrode plates are positioned within the jig. Then the screw 59 can be tightened slightly against the end wall 57 to hold the electrode plates in their proper positions with the correct parallel spacing between each plate. Then the heating apparatus such as the torch 45 may be utilized in fusing the edges 44, 49 and 50 without the necessity of moving the jig during the entire fusing operation. The gauge plates 58 which are generally of the same size and shape as the end walls 54 and 57 permit the edges 44, 49 and 50 of the electrode plates to project outwardly beyond the respective edges of the gauge plates so that when the three edges of each of the electrode plates have been fused together, then the screw 59 can be loosened and the jig of Fig. 9 can be withdrawn from the electrode plate assembly. The edges 51 of the electrode plates become the open end 21 of the electrode assembly of Fig. 3. The torch 45 may have a comparatively low temperature flame, the torch being termed a "burning" torch and utilizing a mixture of oxygen and ordinary illuminating gas.

In the method of Figs. 9 and 10 when the edges 50 have been fused, if desired, the assemblage can be turned so that edges 49 rest on the table when fusing edges 44 and then turned again so that edges 44 rest on the table when fusing edges 49.

In the battery construction as shown in Figs. 11 and 12 insulator separator plate D is eliminated, the front edges 70 of the electrodes in the electrode assembly B1 being spaced from the front edges 71 of the electrodes in the electrode assembly C1, the spacing being sufficient to avoid the possibility of short circuiting across the gap across the electrode assemblies. The electrode assembly B1 may be considered to be the positive electrodes and the electrode assembly C1 may be considered to be the negative electrodes.

Each of the electrodes which make up the electrode assemblies have the ears 72, 73, 74 and 75 formed at the four corners thereof, the successive ears of each electrode being fused together to form a continuous interlocking web along each of the four margins of each electrode assembly thereby assuring a rigid unitary structure which is anchored together along each of the four margins at the four corners of the electrodes. The electrodes, however, being spaced from each other in laminated parallel fashion as has been explained with reference to the electrode assemblies of Fig. 3 and Fig. 6. It will be understood that at the edges of the electrodes the areas between the fused portions are open between the successive electrodes to permit the free passage of the liquid electrolyte solution between the electrodes of each electrode assembly, the electrolyte solution also being free to be maintained at a level above the upper edges 77 of the electrodes adjacent the under surface 78 of the single piece cover 18a. The battery casing A1 may, if desired, be divided into three cell compartments with the partition wall E1 (not shown) and F1 and each of the partition walls may be provided with notches 79 to accommodate the elongated rib 80 which may extend throughout the length of the cover 18a. The floor of the battery casing may be provided with the integral ribs 81 and 82 which may extend across the width of each cell compartment between the opposite end walls of the battery casing and the partition walls E1 and F1 and between the partition walls themselves. Consequently, each cell compartment will have the ribs 81 and 82 extending transversely thereof and projecting upwardly from the floor of the battery casing. These ribs in each cell compartment are spaced from each other a substantial distance thereby providing a trough 83 therebetween. The small amount of decomposed material which will be shed from the front edges 70 and 71 of the electrodes will accumulate in the trough 83 and the ribs 81 and 82 will prevent this accumulation of sediment from establishing a short circuit between the positive and negative electrode assemblies in the region of the lower edges of the electrodes near the floor of the battery casing. The bulk of the decomposed material which will be shed by the electrodes will accumulate on the floor of the battery casing between the outside faces 84 and 85 of the ribs and the inner wall of the battery casing and no short circuiting can occur as a result of these sediment deposits. In other words short circuiting could only occur when the sediment which has accumulated in the trough 83 in each cell compartment overflows the upper longitudinal edges of the ribs 81 and 82 and establishes connection between the front edges 70 and 71 of the electrodes. Since the accumulation of sediment in the trough 83 will be very slow compared to the accumulation of sediment in the remaining areas of the cell compartments, each cell of the battery is assured of a long life before any short circuiting between the positive and negative electrodes assemblies can occur.

Each of the electrode assemblies fit snugly between the walls of the battery casing and the rib 80 and ribs 81 and 82 to prevent the electrode assemblies from being vibrated about independently of the battery casing during usage of the battery in a vehicle, such as an automotive vehicle.

In the method of fabricating electrode assemblies B1 and C1 I have shown in Figs. 14 and 15 the apparatus and the method of fabricating same. Referring to Fig. 15 each electrode assembly is made up of a series of plates or electrodes 1b arranged in laminated fashion parallel to each other, each electrode havinge ears 72, 73, 74 and 75 formed at each of its four corners. The jigs 88 and 89 may each have a comb member 90, 91, 92 and 93—the combs 90 and 91 being separated from each other by the spacer block 94 and the combs 92 and 93 being spaced from each other by means of the spacer block 95, the combs being anchored to the opposite end of the spacer block. Each of the combs have the teeth 96 formed thereon, each tooth serving to separate each successive ear of the electrodes preparatory to the fusing operation. In Fig. 15 I have shown two of the ears 72a and 72b in section as having been cut flush with the upper edges of the comb teeth for illustration purposes. The torch 45 may be utilized for melting and fusing the upper portions 97 of the ears so that these upper portions become greatly reduced in height and become interlocked with each other in the manner as explained with reference to Fig. 3. A terminal post 24a may be fused to the assembly, if desired, while fusing the ears. The comb teeth 96 are of a material which has a considerably higher melting point than the electrode ears and are unaffected by the heat of the torch. The bars 98 may be secured to the upper surfaces of the comb members to prevent the flow of the upper portions of the ears in any direction other than toward each other or away from the bars 98 thereby assuring that the back edges of the ears of the electrodes will be flush with the back edges of the electrodes throughout their entire length (as is clearly shown in Fig. 11). When the ears 72 and 73 have been fused together, then the jigs 88 and 89 may be rotated 180 degrees about the axis of the shaft members 99 and 100 so that the lower ears 74 and 75 are directed upwardly into the position previously occupied by the ears 72 and 73. Then the fusing of the rows of ears 74 and 75 to each other can be accomplished in the same manner as previously explained with reference to the rows of ears 72 and 73 so that the ultimate electrode assembly is made up of a series of plates which are spaced from each other in parallel fashion, all of the plates of each assembly being anchored to each other along four margins consisting of the interlocking of the rows of ears 72, 73, 74 and 75. Thus a rigid unitary structure is formed which will resist buckling of the plates relative to each other and at the same time permitting free flow of the electrolyte solution between the plates except in those areas in which the fusing has been accomplished.

In Figs. 13 and 14 I have shown schematically the apparatus and the method of fabricating the assembly of Fig. 15. Several electrode assemblies can be fabricated at one time by arranging a battery of such electrode assemblies between the bearing posts 101 and 102 which may be anchored to a table top 103 and spaced from each other to accommodate several electrode assemblies arranged end to end. The shaft extensions 100 from each of the succeeding jigs 89 may be fixed together by means of removable collars 104 as by means of set screws 105. The entire battery of electrode assemblies can be rotated by means of a gear 106 secured to shaft 99 the gear 106 being in mesh with gear 107 which is fixed to shaft 108, the shaft 108 being rotated by means of an air or hydraulic circuit as shown in Fig. 14. The hydraulically actuated mechanism may consist of a vane 105 secured to the shaft 108, the vane being adapted for rotation within a 180 degree arc within the annular chamber 110 in the casing 111, a block 112 filling the opposite half of the annular chamber 110. A valve assembly consisting of the valve casing 113 and the valve element 114 which is rotatably journalled within the annular chamber 115 of the valve casing establishes communication between inlet conduit 116 and conduit 117 whenever the valve element 114 is rotated until the handle 118 engages the stop 119 and when the valve element is rotated until the handle 118 is engaged with stop 120, then the inlet conduit 116 is in communication with conduit 121. When the fluid is flowing to conduits 116 and 117 with the valve element in the position as shown in 114, the fluid will enter into the recessed area 122 and act against the vane 109 in forcing the vane to move 180 degrees about the axis of shaft 108. Any liquid in the chamber 110 in front of the vane will pass through conduit 121 and then pass through the discharge outlet 123 back to the oil reservoir. When the handle 118 is rotated against stop 120, then conduit 121 becomes the inlet conduit and the oil is directed against the opposite side of the vane 109 forcing the vane to be rotated 180 degrees back to the position as shown in Fig. 14 and conduit 117 is then in communication with the discharge outlet 123. Thus the entire battery of electrode assemblies can be fused together at the ends which are then facing upwardly and when such fusing operation has been completed, then the valve element 114 can be rotated to effect rotation of the battery of electrode assemblies 180 degrees so that the opposite ends of the electrode assemblies are now in the upper positions preparatory to performing the fusing operation.

I claim:

1. An electrode assembly for a storage battery, comprising: a retainer clip of C-section having a pair of parallel flat rectangular members constituting respective top and bottom wall members and a rectangular end wall member integrally joined to said top and bottom wall members along end margins thereof at one end of the assembly, said clip having an open end opposite said end wall member; a plurality of electrode plates of like polarity arranged in spaced, opposed face to face relation within the confines of said clip, parallel to one another and normal to all of said wall members, each plate having three sides of its periphery integrally joined to the inner face of the respective wall members and a fourth side edge of its periphery exposed at said open end of said retainer clip, said electrode plates and said retainer clip being all of a lead material and the outermost plates being disposed to close the front and rear sides of said assembly.

2. A storage battery comprising: a casing of insulating material having therein an elongated rectangular cell compartment having side walls and end walls and a bottom; a positive cell assembly in one end of said compartment and a negative cell assembly in the opposite end of said compartment; each of said assemblies comprising a group of electrode plates each including a metal grid and active electrode material supported therein, said plates being disposed in closely spaced face to face relation, parallel to one another and to the side walls of said cell compartment, and a retainer clip of C-section enclosing three sides of said group of plates, said clip including top and bottom wall members integrally joined to top and bottom margins of said group of plates and an end wall member normal to and integrally joined to said top and bottom wall members and to said plates at one end of the assembly, said clip and the grids of said plates being of a common metal and integral with one another, whereby said clip and plates constitute a box-like assembly wherein the front and rear plates of the plate group are joined to the front and rear edges of said clip to constitute front and rear closures of said assembly, whereby said assembly is fully closed except at the end of said assembly opposite said end wall member, said opposite ends of said assembly being open with a series of openings between the edges of said plates; the respective positive and negative cell assemblies, as disposed in said compartment, having said open ends thereof in adjacent, opposed end-to-end relation to one another, separated by a vertical gap extending transversely of said compartment; and a single insulator plate disposed in said gap and extending between said compartment side walls and from top to bottom of said compartment so as to divide said compartment into respective positive and negative areas, said insulator plate having an imperforate bottom portion in an area thereof of strip-form extending along the bottom margin thereof and upwardly to a substantial height above the lower margins of said electrode plates, to retain within the respective compartment areas any active electrode material dropping from the electrode plates therein, and said insulator plate having in the remainder of its area above said imperforate bottom portion thereof, a plurality of apertures providing electrolytic communication across said gap and through said open ends of the respective positive and negative cell assemblies, into said assemblies.

References Cited in the file of this patent

UNITED STATES PATENTS

| | | |
|---|---|---|
| 439,850 | Woolf | Nov. 4, 1890 |
| 1,087,612 | Simmons | Feb. 17, 1914 |
| 1,990,445 | Younkman | Feb. 5, 1935 |
| 2,092,214 | Janko | Sept. 7, 1937 |
| 2,206,122 | Rasch | July 2, 1940 |
| 2,281,800 | Reidesel | May 5, 1942 |
| 2,629,760 | Wells et al. | Feb. 24, 1953 |

FOREIGN PATENTS

| | | |
|---|---|---|
| 284,953 | Great Britain | Feb. 3, 1928 |